US011128187B2

(12) United States Patent
Ravaud et al.

(10) Patent No.: US 11,128,187 B2
(45) Date of Patent: Sep. 21, 2021

(54) ROTOR FOR AN ELECTROMAGNETIC MOTOR OR GENERATOR WITH RADIAL FLUX COMPRISING A MESH STRUCTURE HOUSING INDIVIDUAL MAGNETS

(71) Applicant: WHYLOT SAS, Cambes (FR)

(72) Inventors: Romain Ravaud, Labastide-Murat (FR); Loic Mayeur, Saint Santin (FR)

(73) Assignee: Whylot SAS, Cambes (FR)

( * ) Notice: Subject to any disclaimer, the term of this patent is extended or adjusted under 35 U.S.C. 154(b) by 88 days.

(21) Appl. No.: 16/494,997

(22) PCT Filed: Mar. 20, 2018

(86) PCT No.: PCT/FR2018/000063
§ 371 (c)(1),
(2) Date: Sep. 17, 2019

(87) PCT Pub. No.: WO2018/172634
PCT Pub. Date: Sep. 27, 2018

(65) Prior Publication Data
US 2020/0044500 A1 Feb. 6, 2020

(30) Foreign Application Priority Data

Mar. 22, 2017 (FR) ...................................... 1700295
Sep. 18, 2017 (FR) ...................................... 1700936

(51) Int. Cl.
*H02K 1/27* (2006.01)
*H02K 5/04* (2006.01)
(Continued)

(52) U.S. Cl.
CPC ......... *H02K 1/2793* (2013.01); *H01F 7/0221* (2013.01); *H01F 41/0253* (2013.01);
(Continued)

(58) Field of Classification Search
CPC .... H01F 7/021; H01F 7/0221; H01F 41/0253; H02K 15/03; H02K 1/12; H02K 1/27;
(Continued)

(56) References Cited

U.S. PATENT DOCUMENTS 5,619,087 A 4/1997 Sakai
2002/0125780 A1* 9/2002 Shiratori ................ H02K 1/278
310/156.21
(Continued)

FOREIGN PATENT DOCUMENTS

EP 0996212 4/2000
EP 1624555 2/2006
(Continued)

OTHER PUBLICATIONS

International Search Report dated May 30, 2018 from International Application No. PCT/FR2018/000062.
(Continued)

*Primary Examiner* — Alex W Mok
(74) *Attorney, Agent, or Firm* — Crockett & Crockett, PC; K. David Crockett, Esq.

(57) ABSTRACT

A rotor for a motor or for a radial flux electromagnetic generator having a cylindrical support housing a plurality of magnets (4), characterised in that the cylindrical support comprises a cylindrical mesh (5a) having mesh elements each defining a recess (5) for a respective individual magnet (4), each recess (5) having internal dimensions that are just sufficient to allow the introduction of a individual magnet (4) in its interior while leaving a space between the recess (5) and the individual magnet (4) filled by a fibre-reinforced resin, the mesh (5a) being made from a fibre-reinforced insulating material, the rotor comprising a non-conductive composite layer coating the individual magnets (4) and the mesh (5a).

13 Claims, 3 Drawing Sheets

(51) Int. Cl.
*H02K 1/12* (2006.01)
*H02K 15/03* (2006.01)
*H02K 21/12* (2006.01)
*H02K 3/46* (2006.01)
*H02K 1/02* (2006.01)
*H02K 21/24* (2006.01)
*H02K 41/03* (2006.01)
*H01F 7/02* (2006.01)
*H01F 41/02* (2006.01)
*H02K 1/04* (2006.01)
*H02K 1/28* (2006.01)
*H02K 15/12* (2006.01)
*H02K 16/04* (2006.01)
*H02K 7/00* (2006.01)

(52) U.S. Cl.
CPC ............... *H02K 1/02* (2013.01); *H02K 1/04* (2013.01); *H02K 1/12* (2013.01); *H02K 1/27* (2013.01); *H02K 1/28* (2013.01); *H02K 3/46* (2013.01); *H02K 5/04* (2013.01); *H02K 15/03* (2013.01); *H02K 15/12* (2013.01); *H02K 16/04* (2013.01); *H02K 21/12* (2013.01); *H02K 21/24* (2013.01); *H02K 41/031* (2013.01); *H01F 7/021* (2013.01); *H02K 7/003* (2013.01)

(58) Field of Classification Search
CPC .... H02K 1/2753; H02K 1/2793; H02K 21/12; H02K 2213/12; H02K 5/04; H02K 15/12; H02K 16/04; H02K 1/02; H02K 1/04; H02K 1/28; H02K 21/24; H02K 3/46; H02K 41/031; H02K 7/003
USPC ...................................... 310/156.01
See application file for complete search history.

(56) References Cited

U.S. PATENT DOCUMENTS

| | | | |
|---|---|---|---|
| 2011/0285237 A1 | 11/2011 | Amari et al. | |
| 2013/0146453 A1 | 6/2013 | Foo | |
| 2013/0154397 A1* | 6/2013 | Sullivan | H02K 1/141 310/12.18 |

FOREIGN PATENT DOCUMENTS

| | | |
|---|---|---|
| EP | 1780878 | 5/2007 |
| EP | 1982403 | 10/2008 |
| EP | 2043230 | 4/2009 |
| EP | 2306619 | 4/2011 |
| EP | 2333935 | 6/2011 |
| EP | 2773023 | 9/2014 |
| FR | 1475501 | 3/1967 |
| FR | 2996378 | 4/2014 |
| FR | 3014255 | 6/2015 |
| JP | 10121236 | 5/1998 |
| JP | 2005341696 | 12/2005 |
| JP | 2015202514 | 11/2015 |
| WO | WO2016116678 | 7/2016 |

OTHER PUBLICATIONS

International Search Report dated Jun. 13, 2018 from International Application No. PCT/FR2018/000063.
International Search Report dated Jun. 12, 2018 from International Application No. PCT/FR2018/000064.
International Search Report dated Jun. 12, 2018 from International Application No. PCT/FR2018/000066.

* cited by examiner

ROTOR FOR AN ELECTROMAGNETIC MOTOR OR GENERATOR WITH RADIAL FLUX COMPRISING A MESH STRUCTURE HOUSING INDIVIDUAL MAGNETS

FIELD OF THE INVENTIONS

This invention relates to a rotor for an electromagnetic motor or generator with a radial flux with a cell structure. The invention further relates to an electromagnetic motor or generator with a radial flux equipped with a rotor of this type.

BACKGROUND

This invention is advantageously but not restrictively applied to an electromagnetic motor that delivers high power with a high speed of rotation of the rotor, which is achieved as a result of the specific characteristics of the rotor according to this invention. A motor or generator of this type can be used, for example, as an electromagnetic motor in a fully electric or hybrid automotive vehicle.

Advantageously but not restrictively, the electromagnetic motor or generator with a radial flux can comprise at least one motor bordered by two stators, whereby these elements can be superimposed on one another and be separated by at least one air gap on the same shaft.

In high-speed applications it is necessary to have not only a compact system made possible by the reduction of the weight and size of the radial [flux] motor for optimal performance, but also very good mechanical strength of the rotating part, i.e. the rotor, to improve the reliability of the system.

In high-speed applications it is necessary to reduce losses for optimal performance. Miniaturization is an increasingly desirable objective in automotive applications. To achieve that, it is important to have a compact system made possible by the reduction of the weight and size of the radial motor, but also a very good mechanical strength of the rotating part, to improve the reliability of the system.

For an electromagnetic machine with radial flux, the rotor comprises a cylindrical body, the entire circumference of which carries magnets.

With regard to the stator or each stator, they each carry winding elements comprising a tooth that carries a coil, the tooth being bordered on each of its sides by a notch, whereby a metal wire made of a metal that is a good conductor is wound around the tooth to form the coil.

When the single or multiple series of windings are supplied with electricity, the rotor which is rigidly attached to the output shaft of the motor is subjected to a torque originating from the magnetic field, whereby the magnetic flux created is a radial flux for a machine with a radial flux.

For a high-power motor, the rotor rotates at high speeds of rotation. The principal disadvantage of a motor with a high speed of rotation resides in the high probability of a detachment of the magnet or magnets from the rotor as well as the at least partial breaking of the rotor. The rotor of a motor of this type must therefore be capable of withstanding high speeds of rotation.

Prior art document US-A-2011/0285237 describes a motor with an axial air gap.

The object of this document is to simplify the steps in the fabrication of the rotor while preventing the permanent magnets carried by this rotor from being displaced or unscrewed during the assembly, installation and operation of the rotor. The magnets are housed in a one-piece structure made of a molded part that encloses the magnets.

The molded part has grooves separating the magnets into which ribs on a body of the rotor are introduced, which makes it possible to lock the molded part to prevent an axial displacement movement. A radial retention of the molded part is provided by internal and external concentric elements on the molded part.

The subject matter of this prior art document is therefore magnets that are housed in a molded part and it contains no teaching with regard to magnets that are separated from one another. Moreover, the ribs retain the magnets only by their action on the molded part, and therefore not by directly retaining the magnets in the rotor. This prior art document also relates to a motor with an axial and not a radial flux with a different set of problems.

Prior art document EP-A 170 878 describes a rotor of an electromagnetic motor or generator with a radial flux that has at least one cylindrical support that houses a plurality of magnets. This at least one support comprises a cylindrical mesh element that has mesh elements, each of which delimits a housing for a respective individual magnet, and each housing has inside dimensions that are just sufficient to allow the introduction of an individual magnet into its interior.

This prior art document does not disclose any means of retaining the individual magnets in the mesh elements or any means of rigid attachment of the rotor.

Therefore a rotor of this type is not capable of rotating at very high speeds of rotation.

Prior art document JP-A-2015 202514 essentially repeats the disclosure of prior art document EP-A-1 780 878, however without disclosing or suggesting characteristics that might enable the rotor to rotate at very high speeds of rotation.

Prior art document FR-A-2 996 378 describes a magnet structure comprising individual magnets. These individual magnets are adhesively attached by resin without the interposition of any holding element between the individual magnets. In fact, the adhesive connection replaces the mesh described in JP-A-2015 202514 and EP-A-1 780 878 and is not complementary to it. An arrangement of this type could not withstand high speeds of rotation without losing magnets during rotation.

SUMMARY

The problem addressed by the present invention is to design a rotor for an axial flux motor or generator that can effectively hold the permanent magnet or magnets it supports while preventing the magnets from detaching from the rotor.

For this purpose the present invention relates to a motor or generator with a radial flux that has at least one cylindrical support that houses a plurality of magnets, whereby this at least one support comprises a cylindrical mesh that has mesh element, each of which delimits a housing for a respective individual magnet, each housing has inside dimensions that are just sufficient to allow the introduction of an individual magnet into its interior, characterized in that a space is left between the housing and the individual magnet which is filled by a fiber-reinforced resin, the mesh being made of a fiber-reinforced insulating material and the rotor comprising a layer of non-conducting composite material coating the individual magnets and the mesh.

The object of the present invention is to break down one or more of the magnets in a rotor of the prior art into a plurality of small magnets or micro-magnets. A large-dimension magnet is subject to losses by Foucault currents that are greater than its equivalent in small magnets or micro-magnets. The use of small magnets or micro-magnets therefore makes it possible to reduce these losses which are prejudicial to the operation of the rotor.

The rotor with magnets located in the cells of the present invention is designed to reduce the losses in the rotor with rigid attachment means that make it possible to retain the magnets and to reduce the effect of the axial or radial force and of the centrifugal force at very high speeds.

The cracking of a relatively large magnet is frequently the cause of a malfunction of an electromagnetic actuator. The present invention prevents this damage by the presence of a plurality of individual magnets that are smaller than the magnet they are replacing.

The problem then arises of the detachment of an individual magnet from its housing. This problem is solved by the adhesive bonding method proposed by the present invention. The housing is designed to be as small as possible to properly retain the individual magnet and leaves a space between the individual magnets that is only sufficient for the injection of resin. The resin itself is reinforced with fibers so that it has reinforced mechanical holding properties.

The at least one mesh element is advantageously in the form of a honeycomb and has housings with a hexagonal cross-section.

A honeycomb mesh element is known to reinforce the strength of an element, in this case a rotor. Individual magnets are inserted in hexagonal housings that ensure their retention. The walls of the housings act as electrical insulators and the density of the housings in the magnet structure can be significantly increased. The honeycomb mesh structure can be made of fiber-reinforced insulating composite material.

The composite coating of the magnet structure is preferred to iron so as not to induce detent torque. Moreover, its mechanical strength can be high and the coating can easily be applied, in particular by injection of the composite over an arrangement of individual magnets that are held in place in relation to one another by any means. A magnet structure protected by its coating in this manner can withstand high speeds of rotation and the individual magnets are held firmly in place because they are already in a mesh and are adhesively held in place by a layer of resin.

Each individual magnet is advantageously in the form of an elongated block that penetrates lengthwise into its associated housing and extends along the thickness of the mesh element, whereby the elongated block is cylindrical or in the form of a polyhedron with at least one flat longitudinal face and, when the at least one mesh is in the form of honeycomb, each block has a hexagonal longitudinal face.

The elongated block therefore traverses the rotor at least partly, advantageously running all the way through, projecting or not projecting beyond at least the internal or external circumference of the rotor which will be facing the coils of a stator for a rotating electrical actuator and from which the magnetic field is emitted.

According to its most conventional definition, a polyhedron is a three-dimensional geometric shape having polygonal flat faces that intersect along straight-line segments that are called edges, for example a straight or oblique prism, a cube or a pyramid. In the framework of the present invention, it is preferable to have a polyhedron that has two opposite, plane and equal longitudinal polygonal surfaces connected by edges that are straight and parallel such as a hexagonal polyhedron, although the invention is not limited to this design, whereby a single longitudinal surface can be present, with a peak on the other extremity of the polyhedron.

This configuration makes it possible to have a rotor that has numerous blocks forming individual magnets. It has been determined that a rotor with a plurality of individual magnets has a high magnetization capacity as well as high strength, whereby the rotor preferably has a layer of composite material for the coating of the individual magnets.

It is known that, to obtain a magnetic field of optimal intensity, the ideal volume of a magnet must approach that of a cube or a cylinder, the length of which is equal to the diameter. It is common knowledge that increasing the length of a magnet beyond that does not result in any increase in the magnetic field. However, the approach taken by the present invention runs contrary to this preconceived idea.

The length of the individual magnet is significantly longer than the diameter or a diagonal of its plane longitudinal face, which is not suggested by widespread practice, to respond to the requirements for the mechanical strength of the rotor.

According to the invention, it has been determined that a plurality of individual magnets in a rotor are stronger than an individual magnet, while surprisingly increasing the magnetic field supplied by the rotor.

Advantageously a ratio of a surface area of the longitudinal face of the block to the surface area of a face of the mesh from which the housings emerge Is less than 2%.

This makes it possible to have a very high number of blocks on one side of the rotor, whereby the space occupied by a block in the form of an individual magnet compared to the working surface area of the rotor is very small.

The mesh is advantageously made of a material that is not an electrical conductor.

An electrically non-conducting material is preferred to iron because it does not induce a detent torque. A composite is preferred because its mechanical strength is high and the mesh can be fabricated easily, in particular by injection of the composite. Reinforcing fibers in the mesh contribute to an increase in the strength of the rotor and in particular to its rigidity in response to flexing and buckling.

The mesh advantageously has a longitudinal axis that coincides with the axis of rotation of the rotor, whereby each block extends radially to the longitudinal axis of the mesh.

The layer of composite material advantageously comprises reinforcing fibers such as glass fibers or fibers of plastic material.

A single-layer or multi-layer material is advantageously introduced into a space between the mesh and the individual magnet. This material can be a plastic, a composite or a metal coating material for the individual magnets such as nickel or copper. The material can have been deposited on the unit magnet prior to its introduction into the mesh, for example by being a coating materials, or it can have the action of forming a rigid connection between the individual magnet and the mesh element that receives it.

The invention further relates to an electromagnet motor or generator with a radial flux, characterized in that it comprises at least one such rotor and at least one stator.

The electromagnetic motor or generator advantageously comprises at least one rotor associated with two stators.

Finally, the invention relates to a fabrication method for a rotor of this type, characterized in that it comprises the following steps:

positioning and retention of individual magnets at a distance from one another by the introduction of each individual magnet in a respective associated housing of a cylindrical mesh, adhesive connection of each individual magnet by the introduction of a resin around the individual magnet in each housing, injection of a layer of composite around the mesh and individual magnets to coat them.

The individual magnets can have been previously cut into a three-dimensional tile, and in particular to the required width and length of the tile. It has been discovered that the individual magnets have improved magnetic properties compared to the properties of a comparable portion of the magnetic tile.

BRIEF DESCRIPTION OF THE DRAWINGS

Additional characteristics, objectives and advantages of the present invention are described in greater detail below and with reference to the accompanying drawings which are provided merely by way of non-restricting examples and in which.

Figure 1:
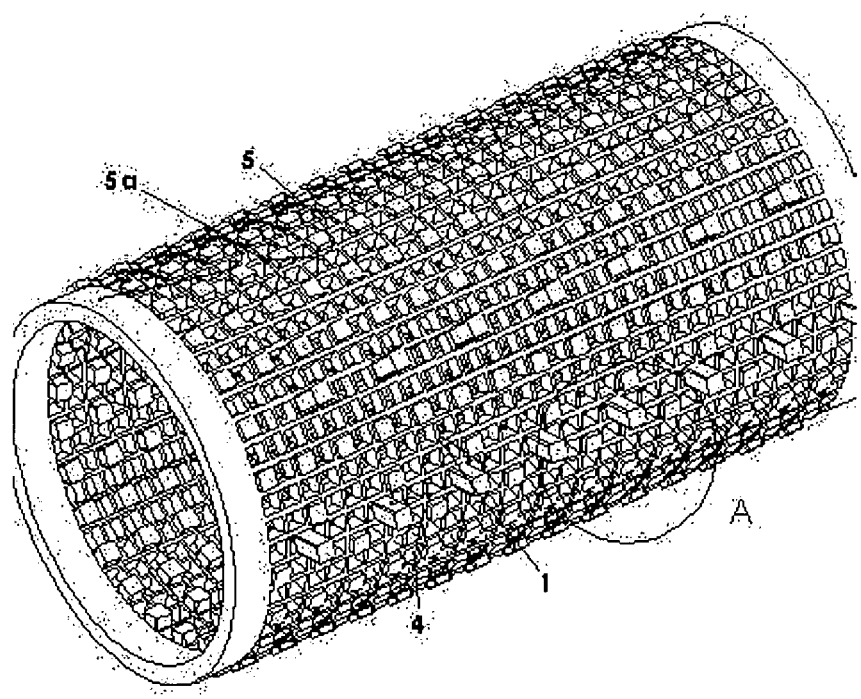
FIG. 1 is a schematic representation of a view in perspective of a mesh forming a rotor with a radial flux according to the present invention, several individual magnets being shown inserted into the mesh.

The illustrations are presented by way of example and in no way restrict the invention. They constitute schematic representations intended to facilitate an understanding of the invention and are not necessarily drawings to scale of practical applications. In particular, the dimensions of the different parts are not representative of reality.

DETAILED DESCRIPTION OF THE INVENTIONS

The object of the present invention is to replace one or more large magnets with a plurality of small individual magnets 4. A magnetic flux is therefore created by a multitude of small individual magnets 4, of which there can be at least 20 and even more than 100 per rotor.

A rotor of the prior art can comprise from 1 to 5 magnets while the present invention provides many more small individual magnets. The small individual magnets 4 according to the present invention can be inserted into the respective cells 5 by a robot. For a medium-size rotor, the small magnets 4 in the framework of the present invention can have a dimension of 4 mm.

With reference to all the Figures, the present invention relates to a rotor of an electromagnetic motor or generator with a radial flux having at least one cylindrical support housing a plurality of magnets.

According to the invention, the at least one support 2a comprises a cylindrical mesh structure 5a having mesh elements that each delimit a housing 5 for a respective individual magnet 4. Each housing 5 has inside dimensions that are just sufficient to allow the introduction of an individual magnet 4 into its interior while leaving a space between the housing in the individual magnet 4 that is filled by a fiber-reinforced resin, whereby the mesh structure 5a and in particular the mesh elements are made of a fiber-reinforced insulating material. FIG. 2A illustrates the coating 5c and filler 5b mentioned above, and shows the mesh structure 5a and the outer face 4b of several magnets disposed within the housings 5 (see FIG. 2) of mesh structure 5a. The fiber-reinforced resin fill 5b is disposed between the magnets 4 and the elements 5e of the mesh structure. The layer of non-conducting composite material on the magnets and mesh structure is shown as item 5c.

To form a strong assembly, the rotor 1, 1a comprises a layer of nonconducting composite coating the individual magnets 4 and the mesh structure 5a. The layer of composite can comprise reinforcement fibers such as glass fibers or fibers made of plastic material, for example Kevlar or polyamide or any plastic material that increases the mechanical strength of the assembly.

This makes it possible to ensure the retention of the individual magnets 4 in their respective housings 5 even at a high speed of movement, for example a high speed of rotation for the rotor 1, 1a, although the invention is not limited to this configuration.

The mesh structure 5a can be in the form of a honeycomb that has housings 5 that have a hexagonal cross-section. In this case, each individual magnet can be in the form of an elongated block 4 that penetrates lengthwise into its associated housing 5 and extends along the thickness direction of the mesh structure 5a.

Figure 2:
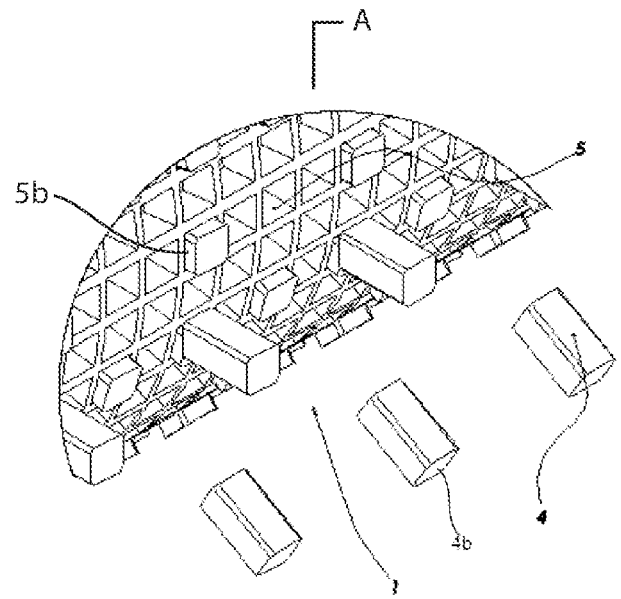
FIGS. 2 and 2A are schematic representations of an enlarged view of the circled part identified as A in FIG. 1 also showing individual magnets completely inserted into the mesh, in the process of insertion and not yet fully inserted.
Figure 2A:
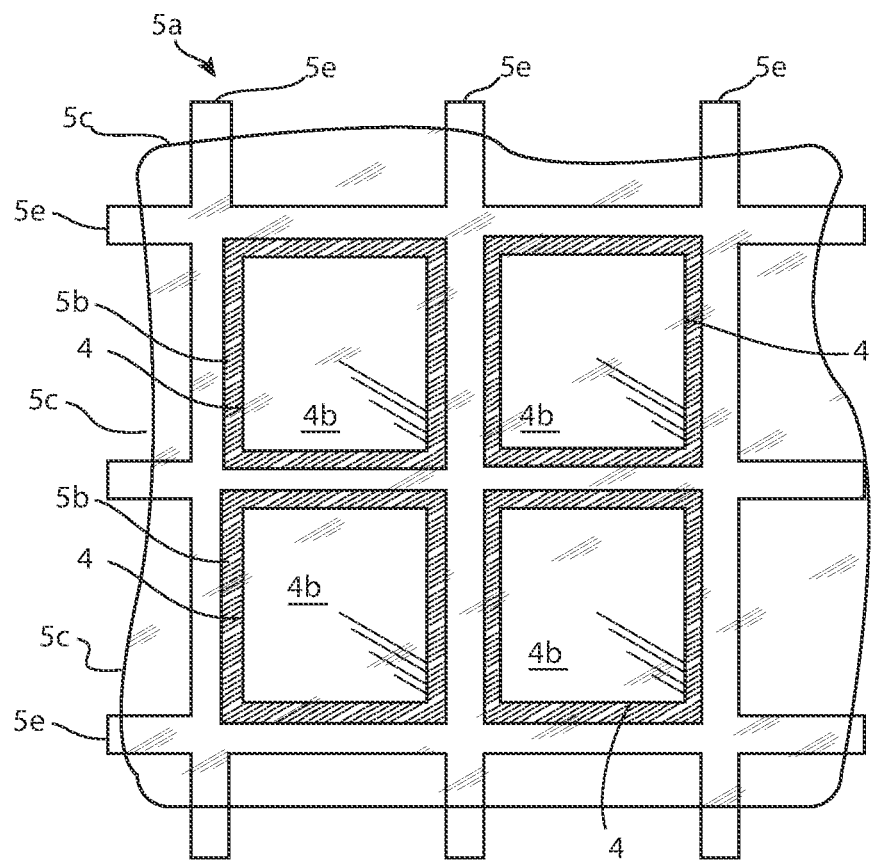

In FIGS. 1 and 2, only some of the individual magnets 4 are shown inserted into the housings 5 of the mesh structure 5a, although in the framework of the invention, each mesh element defines a housing 5 to hold a respective individual magnet 4.

In FIG. 2, individual magnets 4 are shown respectively inserted, in the course of insertion and spaced by the mesh structure 5a. A longitudinal face of a single individual magnet is identified as 4b although what is stated for this referenced longitudinal face also applies to all the longitudinal faces of the individual magnets 4.

According to one preferred characteristic of the invention, each individual magnet 4 can be in the form of an elongated block 4, visible in particular in FIGS. 1 and 2, having a length that extends radially through the cylindrical mesh structure 5a. The elongated block 4 can be cylindrical or in the shape of a polyhedron with at least one plane longitudinal face oriented toward a working surface of the rotor which is the surface facing the windings of a stator in an electromagnetic motor.

When the mesh structure 5a is in the form of a honeycomb, each block 4 can have a hexagonally shaped longitudinal face 4b. Each block 4 can also have a square face. It is this nonrestrictive and not particularly preferred form that is illustrated in FIGS. 1 and 2.

For example, without this configuration being restrictive, the individual magnets 4 can be neodymium iron boron magnets or samarium cobalt magnets or any other type of magnet. The neodymium magnets are sensitive to impacts and to torsion and are highly flammable. By reducing their dimensions by division, the present invention makes it possible to eliminate all these risks and in particular the risks of breakage of the magnets. The fact that they are held in the cells or housings 5 also protects them.

A ratio of a surface area of the longitudinal face 4b of the block 4 to the surface area of a face of the mesh structure 5a where the housings 5 emerge can be less than 2%. This shows that an individual magnet 4 occupies very little space in relation to the total working surface area of the mesh structure 5a. This makes it possible to have a very high number of blocks 4 in the mesh structure 5a.

The mesh structure 5a can be made of a material that is not an electrical conductor, which reduces the detent torque. The mesh structure 5a can be made of Nomex®, high performance meta-aramid synthetic fibers, resin or other plastic fibers.

The mesh structure 5a can have a longitudinal axis that coincides with the axis of rotation of the rotor 1, 1a, whereby each block 4 extends radially with reference to the longitudinal axis of the mesh element 5.

In the framework of one preferred embodiment of the invention, the composite coating layer, the mesh structure 5a surrounding the individual magnets 4 and the adhesive bonding means of the magnets in the housings 5 of the mesh structure 5a can all three be fiber-reinforced. The rotor 1, 1a thereby obtained has very high rupture strength mechanical characteristics.

The invention further relates to an electromagnetic motor or generator with a radial flux. This motor or this generator comprises at least one rotor as described above and at least one stator.

In one preferred embodiment, the electromagnetic motor or generator comprises two stators and one rotor, whereby the rotor, which has a cylindrical shape, has a cylindrical support with separation branches that extend axially over the cylindrical support, and the separation branches axially delimit magnet structures composed of the mesh and the individual magnets.

A binding band advantageously covers one extremity of the rotor in proximity to the cylindrical support, an inner covering cylinder being inserted inside the cylindrical support and an outer covering cylinder being inserted over the exterior of the cylindrical support on the outside periphery of the cylindrical support.

A first stator is advantageously located in the interior of the rotor and has an internal magnetic circuit that carries the coils, whereby the inside covering that covers the internal magnetic circuit and a second stator is located on the outside of the rotor surrounding it, and including an external magnetic circuit in its inside coils, whereby the outer covering is located between two coils and the external magnetic circuit.

The invention finally relates to a method for the fabrication of a rotor of the type described above. The first step in the fabrication method is the positioning and retention of individual magnets 4 at a distance from one another by the introduction of each individual magnet in a respective associated housing 5 of a cylindrical mesh structure 5a.

The second step is the adhesive connection of each individual magnet 4 in the form of the introduction of a resin around the individual magnet 4 in each housing 5. The third step is the injection of a layer of composite around the mesh 5 and the individual magnets 4 to coat them.

Figure 3:
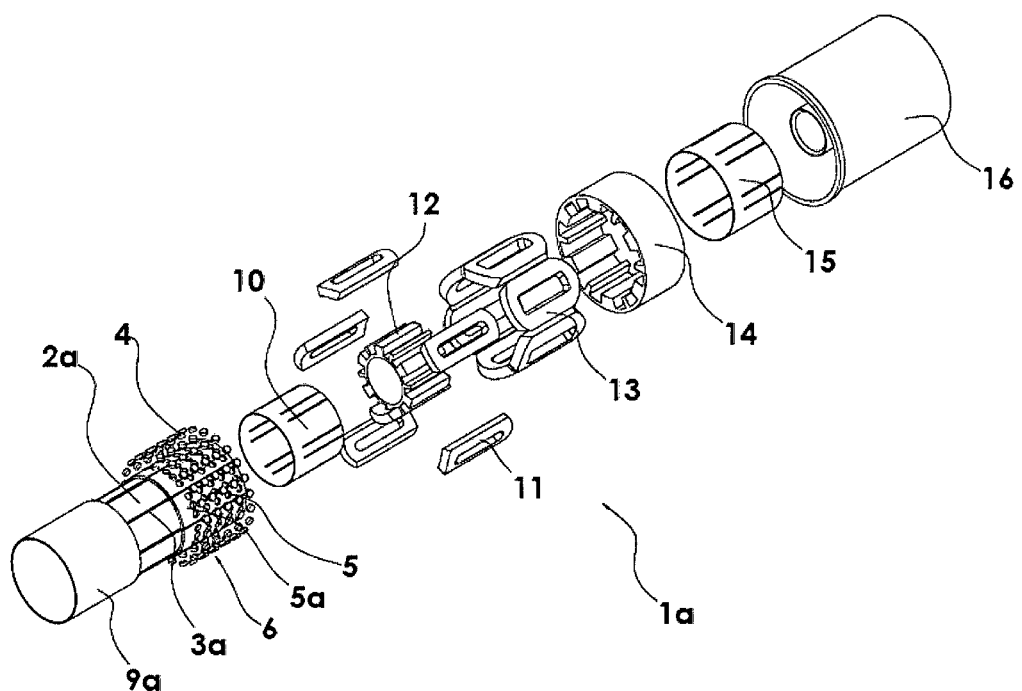
FIG. 3 is a schematic representation of an exploded view of one embodiment according to the present invention of an electromagnetic motor with a radial flux.

In the embodiment illustrated in FIG. 3, which shows an electromagnetic actuator with a radial flux with two stators and one rotor 1a, the cylindrical, rotor 1a with a radial flux has a cylindrical support 2a that can have separation branches 3a which can extend axially over the cylindrical support 2a. The invention is not restricted to the configuration described above.

The separation branches 3a axially delimit the magnet structures 6 composed of the mesh structure 5a and the individual magnets 4. The cylindrical support 2a can be hollowed out between the separation branches 3a to receive the magnets 4 housed in the mesh structure 5a forming a magnet structure 6 composed of the cellular mesh structure 5a with its housings 5 and individual magnets 4.

A binding band 9a covers one extremity of the rotor 1a in proximity to the cylindrical support 2a. Inserted into the interior of the cylindrical support 2a is an inside covering cylinder 10 and an exterior covering cylinder 15 extends over the outside of the cylindrical support 2a on the external periphery of the cylindrical support 2a.

A first stator is located in the interior of the rotor 1a and has an internal magnetic circuit 12 that carries coils 11. The interior covering 10 covers the internal magnetic circuit 12.

A second stator is located on the outside of the rotor la surrounding it and has an external magnetic circuit 14 that includes coils 13 in its interior. The outside covering 15 is located between the coils 13 and the external magnetic circuit 14. A casing 16 covers the assembly of the rotor 1a and the two stators.

In another embodiment not illustrated in FIG. 3, the branches can be in the form of rings spaced one after another in the axial direction of the cylindrical support. The successive branches can project radially on the periphery of the at least one support. The at least one cylindrical support can be hollowed out so that it has, between two successive branches, a housing to hold a unit composed of the cellular structure and the magnets.

The magnet structures 6 composed of the mesh structure 5a and the individual magnets 4 used for a cylindrical support can each be in the form of a closed ring or tiles located at some distance from one another. Otherwise, the arrangement of the stators and optional covering cylinders or binding band in the radial flux actuator according to this other embodiment can be similar to that shown in FIG. 3. This other embodiment is not preferred. The radial flux actuator can also be called a radial flux motor or generator.

The following description can apply to both preferred embodiments of the present invention.

The magnet structures 6, each composed of the mesh structure 5a and individual magnets 4, can be rigidly fastened to the at least one support 2a by fastening means based on ferrous materials, synthetic materials or composite materials.

The rigid fastening means can be an integral part of the rotor and/or can be additional parts attached to the rotor. The additional parts can be welded, bolted, riveted or snapped onto the rotor 1, 1a. It is possible to provide rigid fastening means between each individual magnet 4 and the housing or cell 5 that holds it, with the fastening means on the internal face of the housing or cell 5 of the separation walls 19 that delimit the cell in relation to the adjacent housings or cells 5.

In each magnet structure 6 composed of the cellular mesh structure 5a and the individual magnets 4, the housings or cells 5 can be delimited by separation walls 19, each individual magnet 4 being permanently installed in its respective housing or cell 5 by resin, adhesive or by welding.

The individual magnets 4 and their respective housings or cells 5 can be of variable shapes with their poles oriented in parallel or diverging directions. For example, the dimensions of the housings or cells 5 can differ from one housing or cell 5 to another. The housings or cells 5 do not absolutely have to be in the shape of a hexagon, although that is a preferred shape.

The electromagnetic motor or generator can comprise at least one stator that carries at least one winding including one or more air gaps between the at least one rotor and the at least one stator of one or more stators that carry the winding.

Each stator can comprise a magnetic circuit associated with a winding. The stator can have open or closed teeth or notches. A casing makes it possible to protect the electromagnetic motor or generator when it is used as an actuator.

The stators can be connected in series or in parallel. The offset of one stator from another by an angle, combined with the shape of the notches in the shape of the individual magnets 4, makes it possible to reduce the torque variation and the detent torque.

The actuator can be an electromagnetic motor or generator and can function at very high speeds with or without a speed step-up gear. The motor or the generator can comprise at least two stators connected in series or in parallel or at least two rotors.

The rotor can comprise a rotation shaft that extends perpendicular to the circular faces of the rotor 1, 1a and traverses the two stators. The rotor 1, 1a can be carried by at least two roller bearings, with one roller bearing associated with a respective stator to allow it to rotate with reference to the stators.

The invention claimed is:

1. A rotor (1, la) of an electromagnetic motor or generator with a radial flux that has at least one cylindrical support (2a) that houses a plurality of magnets, whereby this at least one support (2a) comprises a cylindrical mesh structure (5a) that has mesh elements, each of which delimits a housing (5) for a respective individual magnet (4), each housing (5) has inside dimensions that are just sufficient to allow the introduction of an individual magnet (4) into its interior, characterized in that a space is left between the housing (5) and the individual magnet (4) which is filled by a fiber-reinforced resin, the mesh (5a) being made of a fiber-reinforced insulating material and the rotor comprising a layer of non-conducting composite material coating the individual magnets (4) and the mesh (5a).

2. The rotor (1, la) of claim 1, in which the at least one mesh (5a) is in the form of a honeycomb that has housings (5) with a hexagonal cross section.

3. The rotor (1, la) of claim 1, in which each individual magnet is advantageously in the form of an elongated block (4) that penetrates lengthwise into its associated housing (5) and extends along the thickness of the mesh structure (5a), whereby the elongated block (4) is cylindrical or in the form of a polyhedron with at least one flat longitudinal face (4b) and, when the at least one mesh structure (5a) is in the form of honeycomb, each block (4) has a hexagonal longitudinal face (4b).

4. The rotor (1, la) of claim 1, in which a ratio of a surface area of the longitudinal face (4b) of the block (4) to the surface area of a face of the mesh structure (5a) from which the housings (5) emerge is less than 2%.

5. The rotor (1, la) of claim 1, in which the mesh structure (5a) is made of a material that does not conduct electricity.

6. The rotor (1, la) of claim 1, in which the mesh structure (5a) has a longitudinal axis that coincides with the axis of rotation of the rotor (1, la), and each block (4) extends radially in relation to the longitudinal axis of the mesh (5a).

7. The rotor (1, la) of claim 6, in which the layer of composite comprises reinforcement fibers such as glass fibers or fibers of plastic material.

8. The rotor (1, la) of claim 7, in which a single-layer or multi-layer material is introduced into a space between the mesh structure (5a) and the individual magnet (4).

9. An electromagnetic motor or generator with a radial flux, characterized in that it comprises at least one rotor (1, la) as recited in claim 1 and at least one stator.

10. The electromagnetic motor or generator of claim 9, which includes two stators and a rotor (la), the cylindrical rotor (la) having a cylindrical support (2a) that has separation branches (3a) extending axially over the cylindrical support (2a) and the separation branches (3a) axially delimit magnet structures (6) composed of the mesh structure (5a) and individual magnets (4).

11. The electromagnetic motor or generator of claim 9, in which a binding band (9a) covers one extremity of the rotor (la) in proximity to the cylindrical support (2a), an inside covering cylinder (10) being inserted in the interior of the cylindrical support (2a) and an outside covering cylinder (15) being inserted over the outside of the cylindrical support (2a) over the external periphery of the cylindrical support (2a).

12. The electromagnetic motor or generator of claim 11, in which a first stator is advantageously located in the interior of the rotor (la) and has an internal magnetic circuit (12) that carries the coils (11), the inside covering (10) that covers the internal magnetic circuit (12) and a second stator is located on the outside of the rotor (la) surrounding it, and having an external magnetic circuit (14) integrating coils (13) in its interior, the outer covering (15) being located between the coils (13) and the external magnetic circuit (14).

13. A method for the fabrication of a rotor (1, la) as recited in claim 1, characterized in that it comprises the following steps:

positioning and retention of individual magnets (4) at a distance from one another by the introduction of each individual magnet (4) in a respective associated housing (5) of a cylindrical mesh structure (5a), adhesive connection of each individual magnet (4) by the introduction of a resin around the individual magnet (4) in each housing (5), injection of a layer of composite around the mesh structure (5a) and individual magnets (4) to coat them.

* * * * *